(12) United States Patent
Riedel et al.

(10) Patent No.: US 8,947,267 B2
(45) Date of Patent: *Feb. 3, 2015

(54) METHOD AND DEVICE FOR DISPLAYING INFORMATION BY MEANS OF A DUAL-VIEW DISPLAY IN A PASSENGER CABIN OF AN AIRCRAFT OR SPACECRAFT

(75) Inventors: Christian Riedel, Bliedersdorf (DE); Stefan Mahn, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 33 days.
This patent is subject to a terminal disclaimer.

(21) Appl. No.: 13/492,486

(22) Filed: Jun. 8, 2012

(65) Prior Publication Data
US 2012/0313794 A1 Dec. 13, 2012

Related U.S. Application Data

(60) Provisional application No. 61/495,491, filed on Jun. 10, 2011.

(30) Foreign Application Priority Data

Jun. 10, 2011 (DE) .......................... 10 2011 077 345

(51) Int. Cl.
*B64D 11/00* (2006.01)
*B64D 45/00* (2006.01)
*H04N 13/04* (2006.01)

(52) U.S. Cl.
CPC .......... *B64D 11/00* (2013.01); *B64D 2045/007* (2013.01); *H04N 2013/0461* (2013.01)
USPC .......................... 340/945; 340/438; 244/118.5

(58) Field of Classification Search
CPC ... B64D 11/00; B64D 45/0015; B60K 438/00
USPC .............. 340/438, 945; 349/15; 343/700 MS; 725/14; 375/240.03; 244/118.5
See application file for complete search history.

(56) References Cited

U.S. PATENT DOCUMENTS

| | | |
|---|---|---|
| 5,145,128 A | 9/1992 | Umeda |
| 5,707,028 A | 1/1998 | Roeper |

(Continued)

FOREIGN PATENT DOCUMENTS

| | | |
|---|---|---|
| DE | 10359403 | 7/2005 |
| DE | 202005015696 | 2/2006 |

(Continued)

OTHER PUBLICATIONS

German Office Action for Application Serial No. DE 10 2011 077 345.2 dated Oct. 25, 2011.
German Office Action for Application Serial No. DE 10 2011 077 421.1 dated Oct. 27, 2011.
German Office Action for Application Serial No. DE 10 2011 077 344.2 dated Oct. 28, 2011.
Non-Final Office Action for U.S. Appl. No. 13/491,276 dated Sep. 25, 2013.

(Continued)

*Primary Examiner* — Steven Lim
*Assistant Examiner* — Kaleria Knox
(74) *Attorney, Agent, or Firm* — Jenkins, Wilson, Taylor & Hunt, P.A.

(57) ABSTRACT

A method for displaying information by means of a dual-view-display in a passenger-cabin of an air-/spacecraft, comprising the following steps: providing the dual-view-display on a predetermined portion of the passenger-cabin; providing first information by means of the dual-view-display, in such a way that said information can be perceived from a gangway between rows of seats of the passenger cabin; and simultaneously providing second information, different from the first information, by means of the dual-view-display, in such a way that said information can be perceived from one of the rows of seats. A display device for displaying information in a passenger-cabin of an air-/spacecraft, comprising a dual-view-display which is arranged on a predetermined portion of the passenger-cabin, the dual-view-display being configured to provide first and second information in the above described ways. A passenger-cabin for an air-/spacecraft comprising said display-device. An air-/spacecraft comprising said display-device or said passenger-cabin.

9 Claims, 6 Drawing Sheets

(56) References Cited

U.S. PATENT DOCUMENTS

| | | | |
|---|---|---|---|
| 6,104,347 A * | 8/2000 | Snygg et al. | 343/700 MS |
| 7,102,497 B2 * | 9/2006 | Nakano et al. | 340/438 |
| 7,414,831 B1 | 8/2008 | Brown et al. | |
| 7,643,063 B2 | 1/2010 | Trescott | |
| 7,843,449 B2 | 11/2010 | Krah | |
| 8,300,161 B2 * | 10/2012 | Louwsma et al. | 349/15 |
| 8,362,114 B2 * | 1/2013 | Maljkovic et al. | 523/219 |
| 2005/0001787 A1 | 1/2005 | Montgomery et al. | |
| 2006/0146046 A1 | 7/2006 | Longhurst et al. | |
| 2007/0018585 A1 | 1/2007 | Ijzerman et al. | |
| 2008/0158500 A1 | 7/2008 | Kawata et al. | |
| 2008/0181301 A1 * | 7/2008 | Kim | 375/240.03 |
| 2011/0029998 A1 * | 2/2011 | Yip | 725/14 |
| 2012/0319870 A1 | 12/2012 | Riedel et al. | |
| 2012/0320508 A1 | 12/2012 | Riedel et al. | |

FOREIGN PATENT DOCUMENTS

| | | |
|---|---|---|
| DE | 112008001451 | 4/2010 |
| DE | 112008001457 | 4/2010 |
| EP | 1804233 | 7/2007 |
| WO | WO 2006/015562 | 2/2006 |

OTHER PUBLICATIONS

Restriction Requirement for U.S. Appl. No. 13/491,265 dated Oct. 1, 2013.

Non-Final Action for U.S. Appl. No. 13/491,265 dated Jan. 16, 2014.

Final Office Action for U.S. Appl. No. 13/491,276 dated Feb. 25, 2014.

Notice of Allowance for U.S. Appl. No. 13/491,276 dated Jul. 15, 2014.

Final Office Action for U.S. Appl. No. 13/491,265 dated Aug. 11, 2014.

* cited by examiner

# METHOD AND DEVICE FOR DISPLAYING INFORMATION BY MEANS OF A DUAL-VIEW DISPLAY IN A PASSENGER CABIN OF AN AIRCRAFT OR SPACECRAFT

CROSS-REFERENCE TO RELATED APPLICATIONS

This application claims the benefit of and priority to U.S. Provisional Application No. 61/495,491, filed Jun. 10, 2011 and German Patent Application 10 2011 077 345.2, filed Jun. 10, 2011, the entire disclosures of which are herein incorporated by reference.

FIELD OF THE INVENTION

The present invention relates to a method for displaying information by means of a dual-view display in a passenger cabin of an aircraft or spacecraft, to a display device for displaying information in a passenger cabin of an aircraft or spacecraft, to a passenger cabin for an aircraft or spacecraft comprising a display device of this type, and to an aircraft or spacecraft comprising a display device of this type or comprising a passenger cabin of this type.

Although applicable to any aircraft or spacecraft, the present invention is described in greater detail with reference to an aircraft by way of example.

In aircraft, a seat row indication is used so as to make it possible to allocate the passengers to the seats which are reserved for them. The seat row indication is generally configured as a fixedly installed sequence of numbers, for example as a printed adhesive film, which is allocated to a corresponding row of seats. The problem of there being an insufficient seat row indication, in particular in what are known as single-aisle aircraft, is known to the applicant in its internal operations. A single-aisle aircraft refers to an aircraft comprising a central passenger gangway between the right and left rows of seats. In aircraft of this type, the seat row indication is often overlooked or incorrectly interpreted. Further, the seat row indication is not illuminated, and is therefore only legible in good light conditions. It is also very complex to adapt the seat row indication to altered seat layouts. Moreover, there is also no possibility of providing additional information by means of the seat row indication, such as a passenger instruction, known as a to passenger sign, such as a "return to seat" or "no smoking" instruction. Understandably, this situation is to be avoided.

SUMMARY OF THE INVENTION

The object of the present invention is therefore to provide a display device which makes it possible to make a very wide range of information available to the passengers who are located in the passenger gangway.

Accordingly, a method is provided for displaying information by means of a dual-view display in a passenger cabin of an aircraft or spacecraft, comprising the following method steps: providing the dual-view display on a predetermined portion of the passenger cabin; providing first information by means of the dual-view display, in such a way that said information can be perceived from a gangway which is provided between rows of seats of the passenger cabin; and simultaneously providing second information, which is different from the first information, by means of the dual-view display, in such a way that said information can be perceived from one of the rows of seats.

A display device for displaying information in a passenger cabin of an aircraft or spacecraft is further provided, comprising a dual-view display which is arranged on a predetermined portion of the passenger cabin, the dual-view display being configured so as to provide first information, in such a way that the first information can be perceived from a gangway which is provided between rows of seats of the passenger cabin, and the dual-view display being configured so as simultaneously to provide second information, which is different from the first information, in such a way that the second information can be perceived from one of the rows of seats.

The idea behind the present invention is to use a dual-view display in a passenger cabin so as simultaneously to make different information available to passengers in the gangway of the passenger cabin and to passengers in the rows of seats. In this way, it is possible for example to show a video to the seated passengers and for example to make information relating to the seat numbering available to the passengers located in the gangway. The display which is present in any case for what is known as the in-flight entertainment system of the aircraft is thus simultaneously used for providing information which can be perceived in the gangway. This makes an additional display device in the gangway unnecessary, and as a result the total weight of an aircraft comprising a display device of this type is advantageously reduced.

Advantageous configurations and developments of the method and the display device can be found in the dependent claims.

In accordance with a preferred embodiment of the method, the first information can only be perceived from a first viewing direction of the dual-view display, and as a result the first information can only be perceived by passengers who are looking at the dual-view display in the first viewing direction. This makes it possible to allocate the first information to the appropriate passengers in a reliable manner.

In accordance with a further preferred embodiment of the method, the second information can only be perceived from a second viewing direction of the dual-view display, and as a result the second information can only be perceived by passengers who are looking at the dual-view display in the second viewing direction. The first viewing direction is preferably different from the second viewing direction. This makes it possible to allocate the second information to the appropriate passengers in a reliable manner.

In accordance with a preferred embodiment of the method, the first information and the second information are each released alternately by means of a parallax barrier. This makes it possible to release the appropriate information rapidly and reliably, in such a way that the information is made available simultaneously both to the passengers who are located in the gangway and to the passengers who are seated in the row of seats.

In accordance with a preferred embodiment of the display device, the dual-view display is inclined at a first angle of inclination to a transverse axis of the aircraft or spacecraft. This makes good visibility of the dual-view display from the gangway possible.

In accordance with a preferred embodiment of the display device, the dual-view display is inclined at a second angle of inclination to a supply duct of the passenger cabin. In this way, good visibility of the dual-view display from the row of seats is also provided. The supply duct extends in particular parallel to a longitudinal axis of the aircraft or spacecraft.

In accordance with a preferred embodiment of the display device, the dual-view display is integrated into a cover panel of a supply duct of the passenger cabin. This makes simple and rapid assembly and disassembly of the display device possible.

In accordance with a further preferred embodiment of the display device, it comprises a parallax barrier for alternately releasing the first information and the second information. This makes it possible to release the appropriate information rapidly and reliably, in such a way that the information is made available simultaneously both to the passengers located in the gangway and to the passengers seated in the row of seats.

The invention is described in greater detail in the following by way of embodiments, with reference to the appended schematic figures of the drawings.

BRIEF DESCRIPTION OF THE DRAWINGS

In the schematic figures.

DESCRIPTION OF EXEMPLARY EMBODIMENTS

Figure 1:
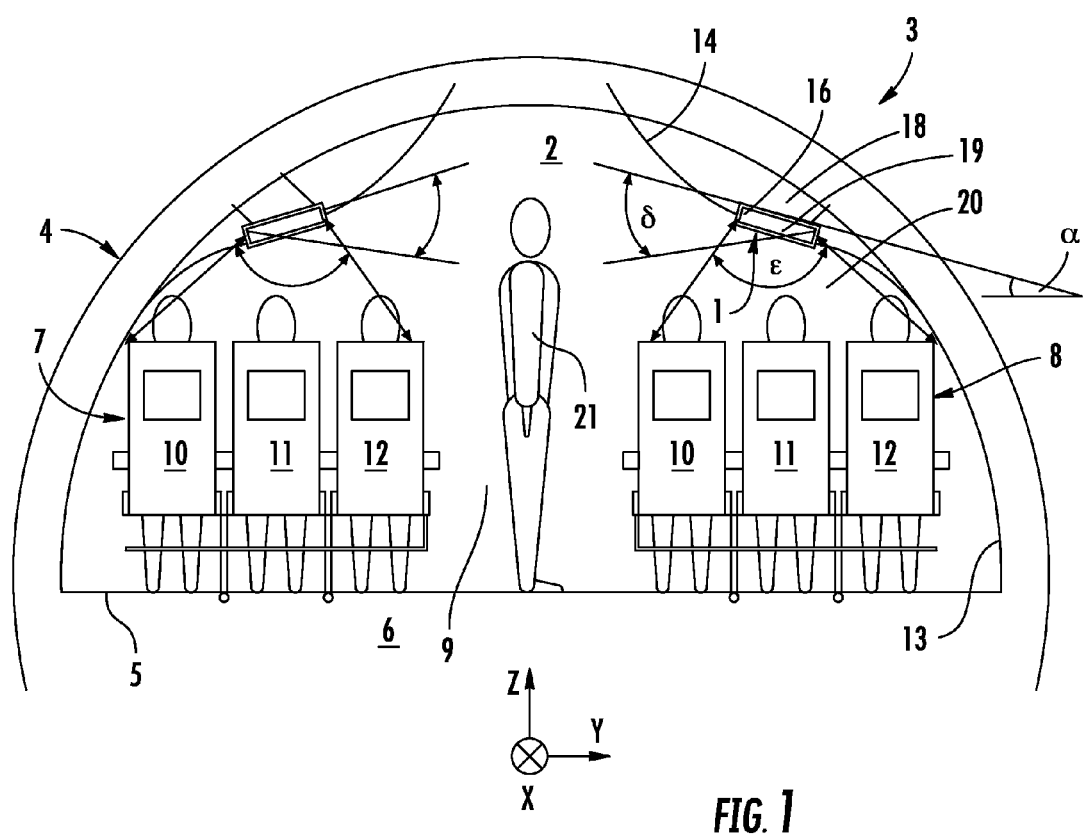
FIG. 1 is a front view of a preferred embodiment of a display device for displaying information in a passenger cabin of an aircraft or spacecraft.
Figure 2:
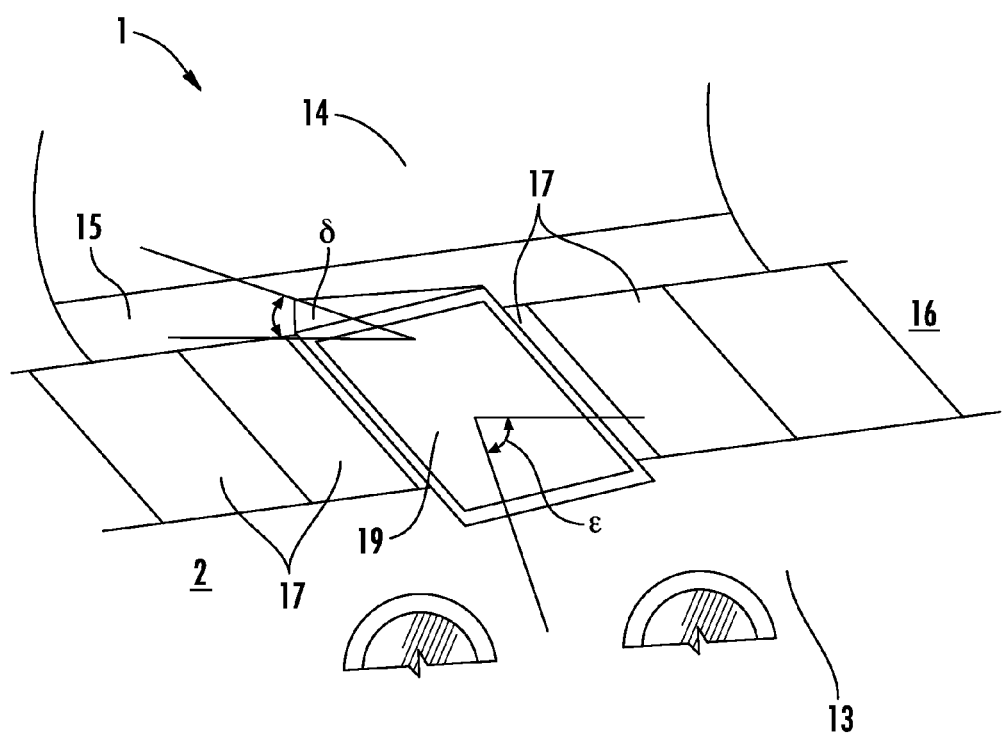
FIG. 2 is a perspective view of the preferred embodiment of the display device according to FIG. 1.
Figure 3:
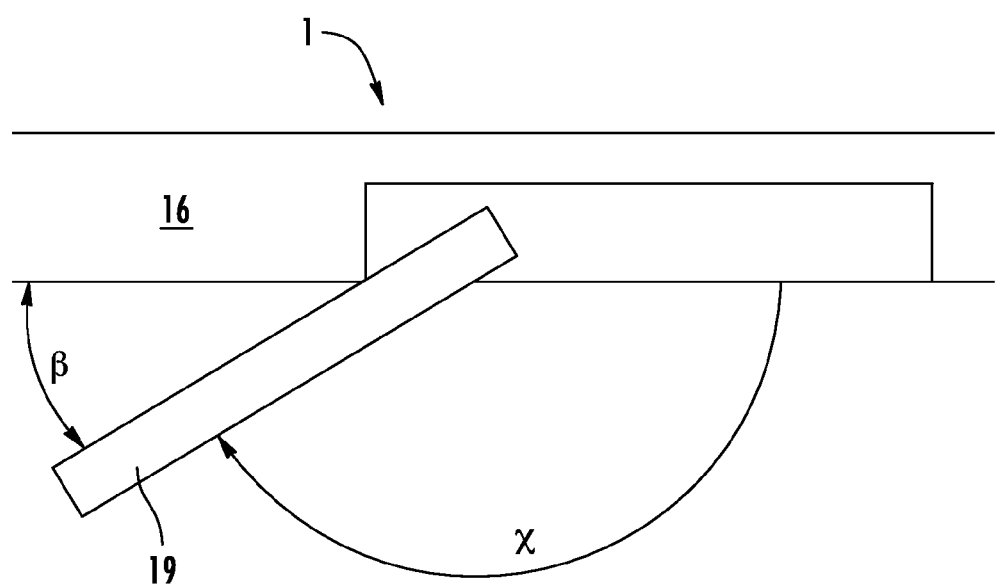
FIG. 3 is a sectional view of a preferred configuration of the preferred embodiment of the display device according to FIG. 1.
Figure 4:
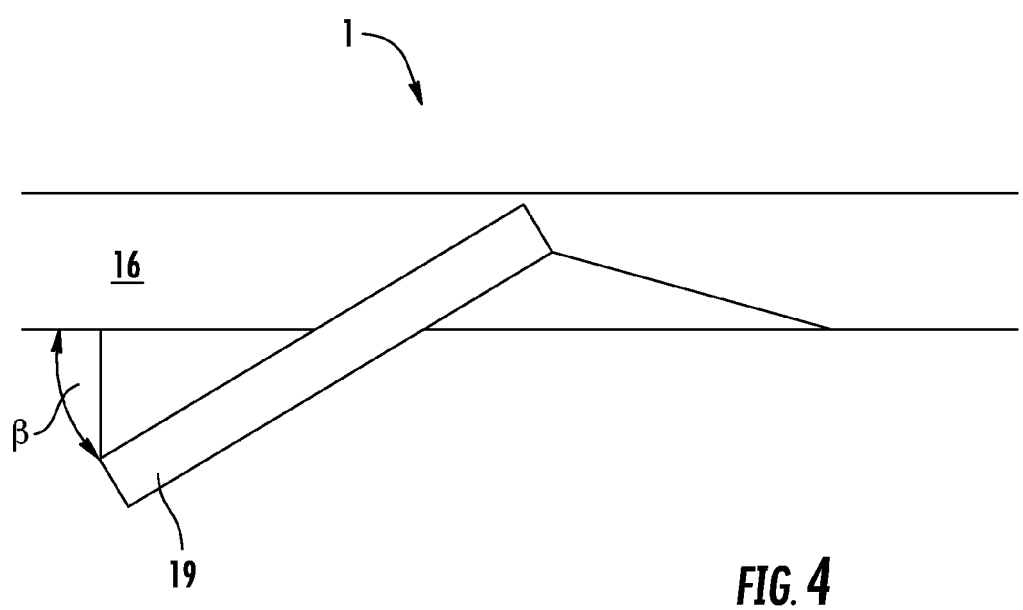
FIG. 4 is a sectional view of a further preferred configuration of the preferred embodiment of the display device according to FIG. 1.

In the figures, like reference numerals denote like or functionally equivalent components unless stated otherwise.

FIG. 1 to 5, to which reference is made simultaneously in the following, illustrate a preferred embodiment of a display device 1 for displaying information in a passenger cabin 2 of an aircraft or spacecraft 3. The aircraft or spacecraft 3 comprises what is known as an in-flight entertainment system (IFE system) for informing and/or entertaining the passengers, which preferably comprises a plurality of display devices 1 which are arranged in the passenger cabin 2. The aircraft or spacecraft 3 comprises a circular cylindrical or oval cylindrical fuselage cell 4, which is shown in a partial sectional view in FIG. 1. A coordinate system illustrates a longitudinal direction or longitudinal axis x, a transverse direction or transverse axis y, and a vertical direction or vertical axis z of the aircraft or spacecraft 3 or the fuselage cell 4. An internal space of the fuselage cell 4 is subdivided by means of a floor 5, preferably substantially horizontally, into two portions, for example into a hold 6 and the passenger cabin 2. The floor 5 preferably extends substantially in the longitudinal direction x and in the transverse direction y. In the passenger cabin 2, preferably any desired number of rows of seats are mounted on the floor 5. In particular, one display device 1 is allocated to each row of seats, but in the following reference is only made to one display device 1. For example, FIG. 1 shows a left row of seats 7 and a right row of seats 8.

In a configuration which is not illustrated of the passenger cabin 2, a central row of seats may be provided between the left row of seats 7 and the right row of seats 8. A gangway 9, in particular what is known as a passenger gangway 9, is provided between the left and right row of seats 7, 8, extends substantially in the longitudinal direction x, and makes it possible for example for a passenger 21 to reach his seat in one of the rows of seats 7, 8. A plurality of gangways, in particular extending mutually parallel, may be provided in the passenger cabin 2. Each of the rows of seats 7, 8 comprises any desired number of seats, in particular three seats 10, 11, 12 each. An inner skin 13 of the fuselage cell 4 forms a side wall 13 of the passenger cabin 2. A display device 1 is preferably allocated to each row of seats 7, 8.

Storage space 14, known as a hat-rack 14, is provided in an overhead region 20 of the rows of seats 7, 8, for stowing the passengers' hand luggage. In particular, a supply duct 16 is arranged on the underside 15 of the storage space 14, and guides for example electrical lines and/or data lines in the passenger cabin 2. The supply duct 16 is preferably covered by means of panels 17, in such a way that the supply duct 16 is not visible from the passenger cabin 2. The cover panels 17 are preferably screwed and/or snapped onto the supply duct 16. The supply duct 16 or the supply duct panels 17 which are arranged on the supply duct 16 are preferably inclined towards the gangway 9. This advantageously provides increased headspace for the passengers seated on the seats 10 to 12.

The display device 1 preferably comprises a display device 19 which is arranged on a predetermined portion 18 of the passenger cabin 2. The display device 19 is in particular configured as what is known as a dual-view display 19, referred to in the following as a display 19. For example, the display 19, in particular a housing of the display 19, may be integrated into one of the cover panels 17 of the supply duct 16. In this configuration, the display device 1 comprises the corresponding cover panel 17.

Alternatively, the predetermined portion 18 may be any suitable portion of the passenger cabin 2. In particular, the predetermined portion 18 may be provided on a wall or surface, which extends vertically or to any degree obliquely, of the passenger cabin 2. For example, the predetermined portion 18 may be provided on what is known as a zone divider, in particular on a vertically extending portion thereof, such as a partition wall, a kitchen module or a toilet module of the passenger cabin 2.

Figure 5:
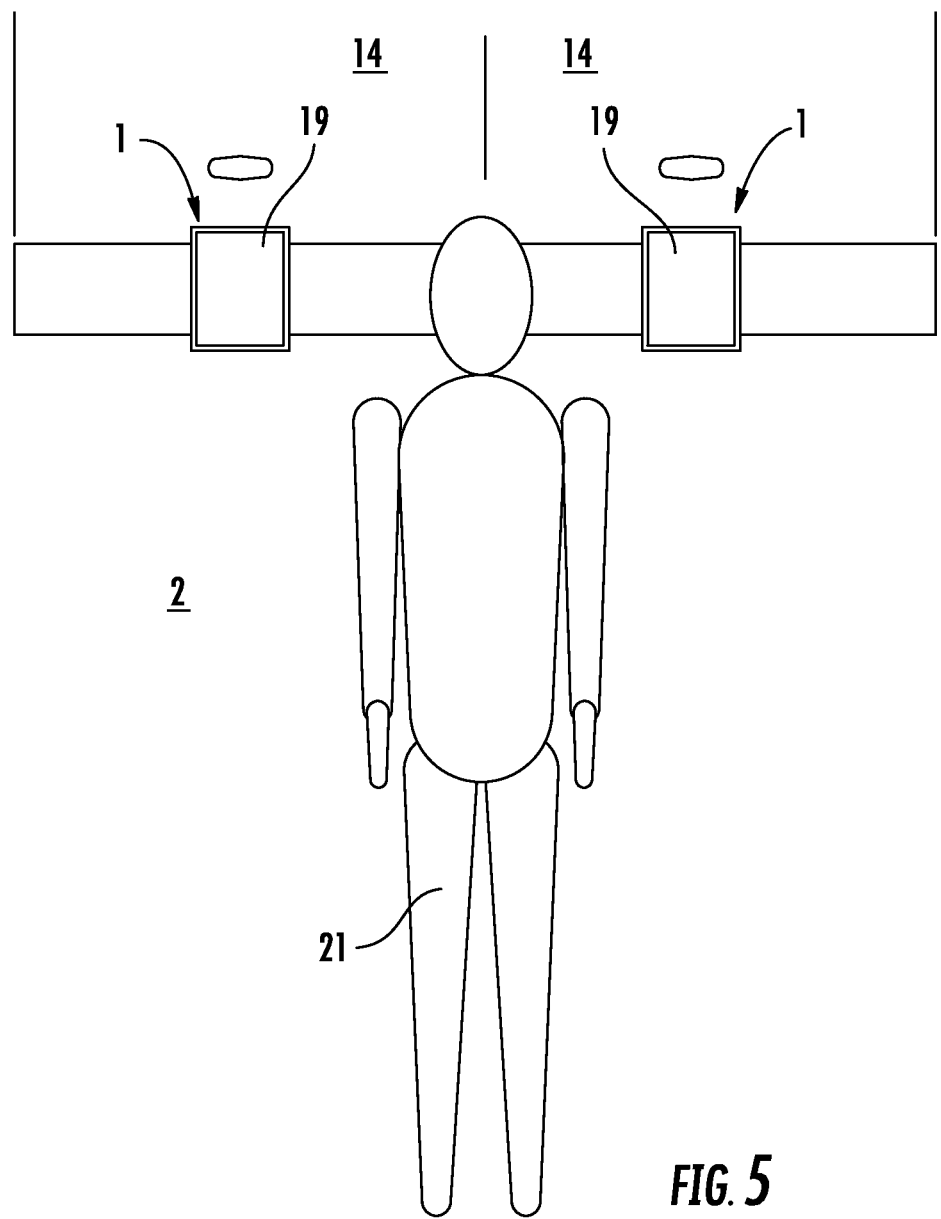
FIG. 5 is a side view of the preferred embodiment of the display device according to FIG. 1.

The predetermined portion 18 of the passenger cabin 2 is preferably a portion of the supply duct 16. Since the supply duct 16 is preferably arranged inclined towards the gangway 9, the display 19 is also positioned inclined towards the gangway 9. In particular, the display 19 is inclined towards the horizontal, that is to say towards the y-axis, at a first angle of inclination $\alpha$. The display 19 is further inclined at a second angle of inclination $\beta$ to the supply duct 16. The second angle of inclination $\beta$ is in particular formed between the display 19 and the supply duct 16. The display 19 may, as illustrated by way of example in FIG. 3, be configured so as to be foldable, an opening angle $\chi$ of the display 19 preferably being configured so as to be larger than a corresponding opening angle of a conventional foldable display. As a result of the larger opening angle $\chi$, the display 19 does not project as far into the passenger cabin as a conventional foldable display. As a result, it is not strictly necessary to fold in the display 19 during boarding, deplaning and taxiing of the aircraft or spacecraft 3. By contrast, it is strictly necessary to fold in a conventional foldable display during boarding, deplaning and taxiing of the aircraft or spacecraft, since otherwise a clear view into the passenger cabin is not provided and the passengers could injure themselves on the folded-out display. In the configuration of the display device 1 according to FIG. 3, the second angle of inclination β is preferably configured so as to be adjustable. The angles β and χ preferably add to 180°. In a further configuration of the display device 1 according to FIG. 4, the display 19 is installed with a fixed second angle of inclination β, that is to say it is not made possible to adjust the second angle of inclination β. The display 19 is in particular arranged at least in portions in the supply duct 16. Because of the inclination of the display 19 at the first and second angle of inclination α, β, the display 19 is visible to the passenger 21 who is standing in the gangway 9, as is shown in FIG. 5. The passenger 21 perceives the display 19 as being upright, the display 19 appearing to the passenger 21 to be aligned parallel to the corresponding row of seats. Since the display 19 is arranged in the overhead region 20, the passenger 21 can allocate a respective display 19 to a respective row of seats or plurality of rows of seats in a simple manner. For example, the seat reservation of a plurality of rows of seats is displayed to the passenger 21 simultaneously by means of the display 19.

The display 19 is preferably configured as a liquid crystal display 19 (LCD). The display device 1 preferably comprises what is known as a parallax barrier, for example in the form of a line grid, which can be switched in cycles and which is arranged upstream from the display 19. The parallax barrier releases two different viewing directions of the display 19, preferably in a time-delayed manner. This time delay is not noticeable to the viewer to whom the respective viewing direction is allocated, since the human eye is too slow. That is to say, by means of the display 19, two different sets of information can be made available to two observers in two different viewing directions of the display 19, effectively simultaneously. The parallax barrier can in particular be configured as a liquid crystal layer, which is switched so as to be transparent or opaque for a viewing direction as required. The parallax barrier is preferably switched in the same cycle as the information which is displayed on the display 19. Alternatively, the display 19 can be configured as what is known as a multiple-view display. In a multiple-view display of this type, the individual pixels are deflected in different viewing directions by means of a lens grid or line grid.

Preferably, the display 19 is configured in such a way that first information, for example a seat row indication, can be perceived by the passenger 21 who is standing in the gangway 9. In particular, the first information can be perceived from a first viewing direction or a first viewing angle δ of the display 19, preferably from the gangway 9. The first information which is provided by means of the display 19 may alternatively or additionally comprise for example the following displays: passenger requests to the cabin crew (known as pax call indication), additional display of passenger notices (known as passenger signs), such as "no smoking", "return to seat", "fasten your seatbelt", "no electronic devices" or the like, the shortest route to the emergency exit, by way of arrows and/or symbols as additional and redundant information for an evacuation system of the aircraft or spacecraft 3, news tickers and/or advertising, general notices for the passengers during boarding and deplaning, and use of the display 19 towards the gangway 9 as a design element, for example as what is known as a mood light. Preferably, the first information is static information, such as a number, a letter, a sequence of numbers, a sequence of letters and/or a symbol.

The display 19 is further in particular constructed in such a way that second information which is different from the first information can be provided simultaneously with the first information. The second information preferably cannot be perceived from the first viewing direction δ of the display 19. The second information can only be perceived from a second viewing direction or a second viewing angle ε of the display 19. The second viewing direction ε is preferably allocated to a row of seats, for example the row of seats 8, in such a way that the second information is only available to passengers who are seated on the seats 10, 11, 12. As stated previously, simultaneous provision of the information should be understood to include time-delayed provision of the information, in a cycled manner so as to be imperceptible to the human eye. The second information is preferably video information, for example an IFE video.

Figure 6:
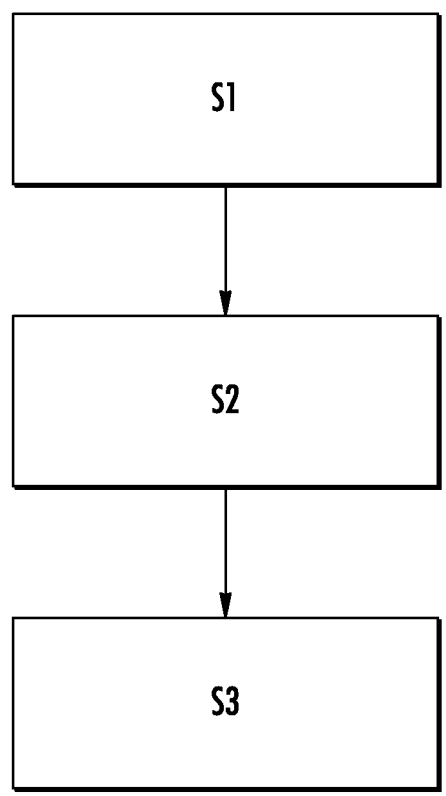
FIG. 6 is a flow chart of a preferred embodiment of a method for displaying information in a passenger cabin of an aircraft or spacecraft.

A preferred configuration, shown in FIG. 6, of a method for displaying information by means of the dual-view display 19 in the passenger cabin 2 of the aircraft or spacecraft 3 comprises for example the following method steps. In a first method step S1, the display 19 is provided on the predetermined portion 18 of the passenger cabin 2. The predetermined portion 18 may for example be provided at least in portions in or on the supply duct 16 of the passenger cabin 2. In a second method step S2, first information is provided by means of the display 19, in such a way that said information can be perceived from the gangway 9 which is provided between the rows of seats 7, 8 of the passenger cabin 2. In a third method step S3, second information which is different from the first information is provided simultaneously with the first information by means of the display 19, in such a way that said information can be perceived from one of the rows of seats 7, 8. The first information is preferably an image, any desired symbol or the like, whilst the second information is preferably a video. Simultaneous provision of the information should be understood in particular to mean that said information is provided for the eye of the viewer or for two different viewers in the gangway 9 and in the row of seats 7, 8 simultaneously. However, this does not exclude the possibility that the information is provided with a particular time delay on the basis of the cycling of the parallax barrier. However, this time delay is not noticeable because the human eye is too slow. The information therefore appears to be provided simultaneously.

By means of the display device 1, it is advantageously possible to use the IFE system, which is present in the passenger cabin 2 in any case, of the aircraft or spacecraft 3 to provide information which can be perceived from the gangway 9. It is not necessary to apply an additional seat row indication in the form of fixedly installed indication labels in the gangway 9. For this purpose, on the one hand the display 19 is correspondingly at an inclination to the gangway 9 so as to be visible, and on the other hand the display 19 is configured so as to provide different information for different viewing directions δ, ε of the display 19. The information which can be perceived in the gangway 9 may comprise additional information, such as passenger signs such as "return to seat" or the like, as well as a seat row indication which is very clearly perceptible, in particular in the dark. Further, in the event of a crash, the shortest route to the emergency exit can be displayed in the gangway 9 by means of the display 19, in addition to the evacuation system of the aircraft or spacecraft 3. A set seat row indication can be adapted, in particular very flexibly and rapidly, to different cabin layouts.

The stated materials, numbers and dimensions should be taken as examples, and serve merely to illustrate the embodiments and developments of the present invention.

Naturally, it is also possible to make use of the invention in other fields, in particular in vehicle manufacture or ship construction.

LIST OF REFERENCE SYMBOLS

1 display device
2 passenger cabin 3 aircraft or spacecraft
4 fuselage cell
5 floor
6 hold
7 row of seats
8 row of seats
9 gangway
10 seat
11 seat
12 seat
13 side wall
14 storage space
15 underside
16 supply duct
17 panel
18 portion
19 display device
20 overhead region
21 passenger
α angle of inclination
β angle of inclination
X opening angle
δ viewing direction
ε viewing direction

The invention claimed is:

1. A method for displaying information in an aircraft or spacecraft, the method comprising:
   installing the dual-view display on a supply duct of the passenger cabin;
   inclining the dual-view display at a first angle towards a gangway of the passenger cabin that is disposed between a first row of seats and a second row of seats;
   providing first information via the dual-view display, wherein the first information is perceivable from the gangway of the passenger cabin; and
   simultaneously providing second information, which is different from the first information, via the dual-view display, wherein the second information is perceivable from each seat of either the first row or the second row of seats;
   wherein the first information is only perceivable from a first viewing direction of the dual-view display, and wherein the second information is only perceivable from a second viewing direction of the dual-view display.

2. The method according to claim 1, wherein a parallax barrier alternately releases the first information and the second information.

3. A display device for displaying information in a passenger cabin of an aircraft or spacecraft, the device comprising:
   a dual-view display installed on a supply duct of a passenger cabin of an aircraft or spacecraft, the dual-view display being inclined at a first angle towards a gangway of the passenger cabin that is disposed between a first row of seats and a second row of seats, the dual-view display being configured to provide first information that is perceivable from the gangway, and the dual-view display being configured to simultaneously provide second information, which is different from the first information, and perceivable from each seat of either the first row or the second row of seats;
   wherein the first information is only perceivable from a first viewing direction of the dual-view display, and wherein the second information is only perceivable from a second viewing direction of the dual-view display.

4. The display device according to claim 3, wherein the dual-view display is inclined at a second angle of inclination with respect to the supply duct of the passenger cabin.

5. The display device according to claim 3, wherein the dual-view display is integrated into a cover panel of the supply duct of the passenger cabin.

6. The display device according to claim 3, wherein the display device comprises a parallax barrier for alternately releasing the first information and the second information.

7. A passenger cabin for an aircraft or spacecraft, comprising a display device according to claim 3.

8. An aircraft or spacecraft, comprising a display device according claim 3.

9. An aircraft, comprising a passenger cabin according to claim 7.

* * * * *